United States Patent
Dong et al.

(10) Patent No.: US 12,450,875 B2
(45) Date of Patent: Oct. 21, 2025

(54) METHOD AND APPARATUS FOR TRAINING RELATIONSHIP RECOGNITION MODEL AND METHOD AND APPARATUS FOR ANALYZING IMAGE

(71) Applicant: Alipay (Hangzhou) Information Technology Co., Ltd., Zhejiang (CN)

(72) Inventors: Xingning Dong, Zhejiang (CN); Yuan Cheng, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 313 days.

(21) Appl. No.: 18/336,810

(22) Filed: Jun. 16, 2023

(65) Prior Publication Data
US 2023/0410474 A1  Dec. 21, 2023

(30) Foreign Application Priority Data
Jun. 20, 2022  (CN) .......................... 202210698004.6

(51) Int. Cl.
*G06V 10/764* (2022.01)
*G06V 10/774* (2022.01)
*G06V 10/776* (2022.01)

(52) U.S. Cl.
CPC .......... *G06V 10/764* (2022.01); *G06V 10/774* (2022.01); *G06V 10/776* (2022.01)

(58) Field of Classification Search
CPC ... G06V 10/764; G06V 10/774; G06V 10/776
See application file for complete search history.

(56) References Cited

U.S. PATENT DOCUMENTS

| | | | | |
|---|---|---|---|---|
| 10,529,077 B2* | 1/2020 | Mehrseresht | ........... | G06N 3/048 |
| 10,657,376 B2* | 5/2020 | Lee | ........... | G06F 18/214 |
| 11,151,169 B2* | 10/2021 | Wroblewski | ........... | G06N 5/022 |
| 11,379,758 B2* | 7/2022 | Ubaru | ........... | G06N 20/20 |
| 11,494,660 B2* | 11/2022 | Chidlovskii | ........... | G06N 3/047 |
| 11,645,756 B2* | 5/2023 | Kao | ........... | G06T 7/168 |
| | | | | 382/154 |

(Continued)

FOREIGN PATENT DOCUMENTS

WO    WO-2019154817 A1 *   8/2019   ............ H04N 19/82

*Primary Examiner* — Manav Seth
(74) *Attorney, Agent, or Firm* — Seed IP Law Group LLP

(57) ABSTRACT

Implementations of the present specification provide a method for training a relationship recognition model and a method and an apparatus for analyzing an image by using the model. The training method includes: dividing a total relationship class set into K groups, and correspondingly setting K classifiers, where the kth classification space corresponding to any kth classifier includes classification space corresponding to a previous classifier and relationship classes in a kth group; sampling a full set of image samples for the K classifiers to obtain K sample subsets respectively, and inputting the K sample subsets to corresponding classifiers to obtain relationship class prediction results between objects in images; and determining a first loss based on classification losses of the K classifiers, and determining a second loss based on a similarity between relationship class prediction results of different classifiers in the K classifiers for a same pair of objects, so that a relationship recognition model is updated based on the first loss and the second loss.

20 Claims, 5 Drawing Sheets

(56) References Cited

U.S. PATENT DOCUMENTS

| | | | |
|---|---|---|---|
| 11,941,918 B2* | 3/2024 | Nikitidis | B33Y 50/02 |
| 2021/0365740 A1* | 11/2021 | Hu | G06F 16/55 |
| 2021/0390355 A1* | 12/2021 | Xu | G06F 18/214 |
| 2022/0012640 A1* | 1/2022 | Iyengar | G06N 20/20 |

* cited by examiner

METHOD AND APPARATUS FOR TRAINING RELATIONSHIP RECOGNITION MODEL AND METHOD AND APPARATUS FOR ANALYZING IMAGE

TECHNICAL FIELD

One or more implementations of the present specification relate to image data processing in artificial intelligence.

BACKGROUND

Image recognition and analysis have been widely used in various technical scenarios. For better understanding of semantic information in an image, some technical solutions have been proposed to further recognize a relationship between objects in the image in addition to recognizing the objects, to better interpret the content of the image. This is also called scene graph generation. The task of scene graph generation is to detect classes of all objects in a given image and a pairwise relationship between the objects and further organize semantic graph structure data that can highly summarize visual information in the image by using the detected objects as nodes and the pairwise relationship between the objects as an edge.

Scene graph generation is a midstream computer vision task that connects object recognition tasks at the bottom layer, for example, target detection and semantic recognition and high-level visual-semantic tasks, for example, visual question answering and image description. Therefore, the task of scene graph generation has an important connection function, organically combines image detection with image understanding, and is an important aid for achieving higher-level image understanding.

SUMMARY

The present specification provides a method for training a relationship recognition model, a method for analyzing an image, and corresponding apparatuses to improve the accuracy of object relationship recognition.

According to an aspect, a method for training a relationship recognition model is provided. The relationship recognition model includes an encoder network and a classification network, the encoder network is used to recognize and encode a plurality of objects included in an image, the classification network is used to recognize a relationship class between the plurality of objects from a predetermined relationship class set, and the method includes: dividing the relationship class set into K groups, and correspondingly setting K classifiers to form the classification network, where classification space of a first classifier in the K classifiers corresponds to relationship classes in a first group, and a kth classification space corresponding to a subsequent kth classifier includes classification space corresponding to a previous classifier of the kth classifier and relationship classes in a kth group; sampling a full set of image samples for the K classifiers to obtain K sample subsets respectively; inputting a sample image in each sample subset of the K subsets to a corresponding classifier by using the encoder network to obtain a relationship class prediction result between objects in the sample image; determining a first loss based on classification losses of the K classifiers, a classification loss of a classifier of the K classifiers being determined based on a relationship class prediction result obtained by the classifier and a corresponding class label; determining a second loss based on a similarity between relationship class prediction results of different classifiers in the K classifiers for a same pair of objects; and determining a total prediction loss based on the first loss and the second loss, and updating the encoder network and the K classifiers based on the total prediction loss.

According to an aspect, a method for analyzing an image is provided. The method includes: obtaining a relationship recognition model trained according to the method of the first aspect, where the relationship recognition model includes an encoder network and a classification network, and the classification network includes K classifiers; and inputting a target image to be recognized to the Kth classifier by using the encoder network, and predicting a relationship class between a plurality of objects included in the target image.

According to an aspect, a method for analyzing an image by using a relationship recognition model is provided. The relationship recognition model includes an encoder network and a classification network, the encoder network includes a detection sub-network and a first encoder, and the method includes: inputting a target image to the detection sub-network to obtain image features, frame information, and initial object classes of some objects included in the target image; performing an attention-based encoding operation based on the image features, the frame information, and the initial object classes by using the first encoder, to obtain encoded features of the objects; and inputting the encoded features of the objects to the classification network to recognize a relationship class between the objects, where the first encoder includes some hybrid attention layers, each hybrid attention layer includes a self-attention module and a cross-attention module disposed for each of two types of features, and the attention-based encoding operation includes the following operations in a single hybrid attention layer: performing a self-attention-based transformation on either one of the two types of features that are inputted by using a self-attention module corresponding to the either one type of feature, to obtain a first transformed feature; performing a composite transformation on the two types of features based on attention of another one of the two types of features relative to the one type of feature by using a cross-attention module corresponding to the one type of feature, to obtain a second transformed feature; and combining the first transformed feature and the second transformed feature as an output of the one type of feature, where two types of features input to the first encoder include a first type of feature obtained based on the image features and the frame information of the first objects and a second type of feature obtained based on the initial object classes of the first objects.

According to an aspect, a method for analyzing an image by using a relationship recognition model is provided. The relationship recognition model includes an encoder network and a classification network, the encoder network includes a detection sub-network, a first encoder, a first decoder, and a second encoder, and the method includes: inputting a target image to the detection sub-network to obtain image features, frame information, and initial object classes of some objects included in the target image; performing an attention-based encoding operation based on the image features, the frame information, and the initial object classes of the objects by using the first encoder, to obtain first encoded features of the objects; obtaining corrected object classes of the objects based on the first encoded features of the objects by using the first decoder; performing an attention-based encoding operation based on the image features, the first encoded features, and the corrected object classes of the objects by using the second encoder, to obtain second encoded features of the objects; and inputting the second encoded features of the objects to the classification network to recognize a relationship class between the objects, where one or more of the first encoder or the second encoder include some hybrid attention layers, each hybrid attention layer includes a self-attention module and a cross-attention module disposed for each of two types of features, and the attention-based encoding operation includes the following operations in a single hybrid attention layer: performing a self-attention-based transformation on either one of the two types of features that are inputted by using a self-attention module corresponding to the either one type of feature, to obtain a first transformed feature; performing a composite transformation on the two types of features based on attention of another one of the two types of features relative to the one type of feature by using a cross-attention module corresponding to the one type of feature, to obtain a second transformed feature; and combining the first transformed feature and the second transformed feature as an output of the one type of feature, where two types of features input to the first encoder include a first type of feature obtained based on the image features and the frame information of the first objects and a second type of feature obtained based on the initial object classes of the first objects; and two types of features input to the second encoder include a first type of feature obtained based on the image features and the first encoded features of the first objects and a second type of feature obtained based on the corrected object classes of the first objects.

According to an aspect, an apparatus for training a relationship recognition model is provided. The relationship recognition model includes an encoder network and a classification network, the encoder network is used to recognize and encode a plurality of objects included in an image, the classification network is used to recognize a relationship class between the plurality of objects from a predetermined relationship class set, and the apparatus includes: a grouping and setting unit, configured to divide the relationship class set into K groups, and correspondingly set K classifiers to form the classification network, where classification space of a first classifier in the K classifiers corresponds to relationship classes in a first group, and a kth classification space corresponding to a subsequent kth classifier includes classification space corresponding to a previous classifier of the kth classifier and relationship classes in a kth group; a sampling unit, configured to sample a full set of image samples for the K classifiers to obtain K sample subsets respectively; a predicting unit, configured to input a sample image in each sample subset of the K subsets to a corresponding classifier by using the encoder network to obtain a relationship class prediction result between objects in the sample image; a first loss determining unit, configured to determine a first loss based on classification losses of the K classifiers, where a classification loss of a classifier of the K classifiers is determined based on a relationship class prediction result obtained by the classifier and a corresponding class label; a second loss determining unit, configured to determine a second loss based on a similarity between relationship class prediction results of different classifiers in the K classifiers for a same pair of objects; and an updating unit, configured to determine a total prediction loss based on the first loss and the second loss, and update the encoder network and the K classifiers based on the total prediction loss.

According to an aspect, a computer-readable storage medium is provided. The computer-readable storage medium stores a computer program, and when the computer program is executed on a computer, the computer is enabled to perform the method according to the first aspect.

According to a seventh aspect, a computing device is provided. The computing device includes one or more memory devices and one or more processors, the one or more memory devices individually or collectively store executable code, and the one or more processors individually or collectively implements the method according to the first aspect when executing the executable code. For example, each of the one or more processors may perform a portion of the actions or the method process(es) described herein. The one or more processors may be residing in a same computing device or may be residing in multiple computing devices that are coupled together through data or communication links, e.g., internet or intranet connections, in a distributed computing environment. The one or more processors also may be processor level virtual machines in a virtualization environment.

In the implementations of the present specification, in a process of training a relationship recognition model, a training data set is divided into a plurality of subsets distributed in balance, and a plurality of classifiers are introduced to respectively learn the plurality of balanced subsets. Then the plurality of classifiers are collaboratively trained by performing knowledge accumulation and transfer in these classifiers, to facilitate final unbiased relationship prediction. In addition, a hybrid attention layer is introduced in an encoder network of the relationship recognition model, so that a visual feature and a text feature are better fused, a feature representation capability is improved, and relationship recognition performance is improved.

BRIEF DESCRIPTION OF DRAWINGS

To describe the technical solutions in the implementations of the present specification more clearly, the following briefly describes accompanying drawings required for describing the implementations. Clearly, the accompanying drawings in the following descriptions show merely some implementations of the present specification, and a person of ordinary skill in the art can still derive other accompanying drawings from these accompanying drawings without making innovative efforts.

DESCRIPTION OF IMPLEMENTATIONS

The following describes the example solutions provided in the present specification with reference to the accompanying drawings.

Figure 1:
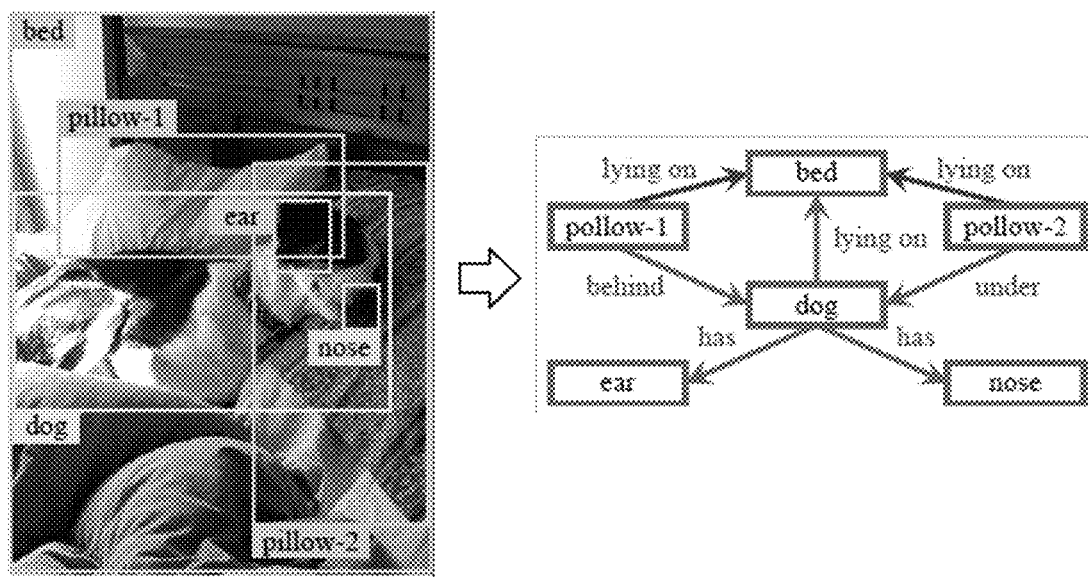
FIG. 1 illustrates a schematic process of scene graph generation.

FIG. 1 illustrates a schematic process of scene graph generation. As shown in the figure, given an image, the task of scene graph generation includes the following: First, all objects in the image are detected, and classes of the objects are recognized. As shown in the figure, on the left of the figure, each frame encloses one object, and a class of the object is labelled. For example, the object class is dog, ear, or nose. Then a relationship between the objects is recognized, and a scene graph on the right is generated by using the detected objects as nodes and the relationship between the objects as an edge. It can be seen that in the scene graph, the nodes include previously labelled objects, for example, dog, ear, and nose, and edges between the nodes represent relationships between the objects in the figure, for example, "lying on" and "has." For example, the relationship between the object "dog" and the object "bed" is "lying on," and the relationship between the object "dog" and the object "ear" is "has."

It can be understood that the core of the above scene graph generation process is recognition of relationships between objects, which is a classification process. Therefore, a relationship recognition model can be constructed based on classification of relationship classes between objects.

Figure 2:
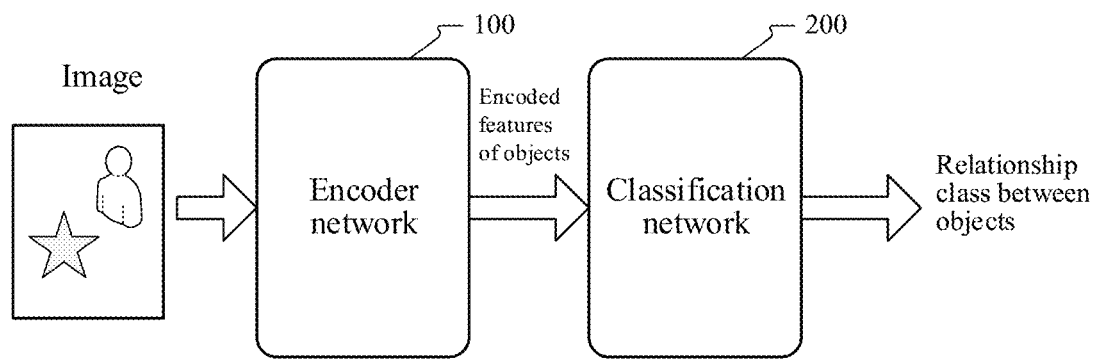
FIG. 2 illustrates an overall architecture of a relationship recognition model according to an implementation.

FIG. 2 illustrates an overall architecture of a relationship recognition model according to an implementation. As shown in FIG. 2, the relationship recognition model can include an encoder network 100 and a classification network 200. The encoder network 100 is used to recognize and encode a plurality of objects included in an image to obtain encoded features of the objects. The classification network 200 recognizes a relationship class between the objects from a total relationship class set based on at least the encoded features of the objects. Such a relationship recognition model needs to be trained by using a training data set including images with labels that include not only labels of object classes but also labels of relationship classes between objects.

Figure 3:
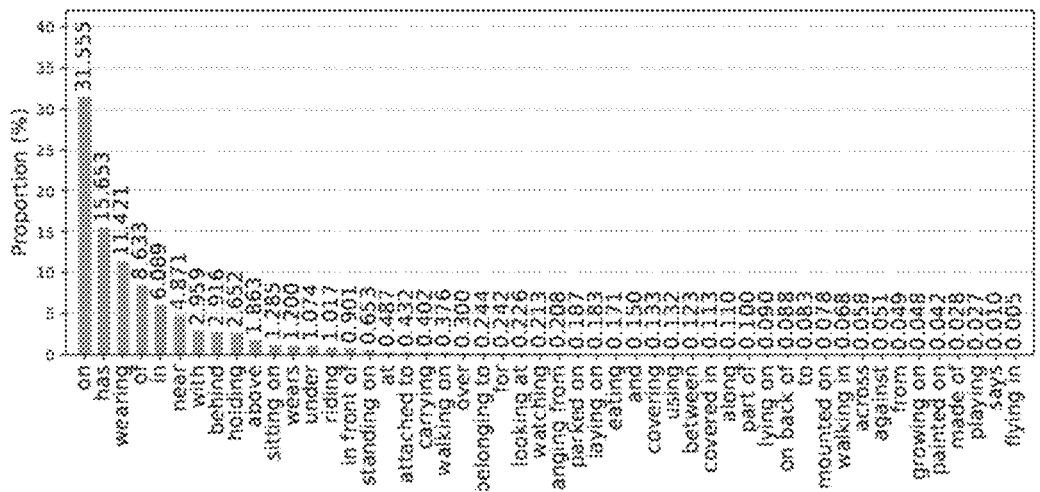
FIG. 3 illustrates distribution of relationship classes in a typical training data set.

The inventors have found that in the training data set for training the relationship recognition model, a distribution deviation of relationship classes between objects is very large, and the long tail effect of distribution is serious. FIG. 3 illustrates distribution of relationship classes in a typical training data set. As shown in FIG. 3, a small number of head relationship classes occupy most of training samples. For example, "on" in the first place occupies 31.56% of all training samples, while "flying in" in the $50^{th}$ place occupies only 0.005%. This may lead to a serious shift towards the head classes in the convergence process of the model during training. Consequently, prediction results can only cover the limited head relationship classes, but ignores a large number of tail relationship classes. In addition, compared with the head relationship classes (for example, on, has, and near), the tail relationship classes (for example, riding, eating, and pulling) have a higher amount of information. The latter is the ideal prediction result because the latter provides more valuable prior input to an upstream visual understanding task. Therefore, the long tail effect of distribution of the relationship classes in the training data set brings challenges to training of the relationship recognition model, and also affects the performance of the trained model.

In the implementations of the present specification, a technical solution of group-based co-training by using a plurality of classifiers is provided. Based on this technical solution, a training data set is divided into a plurality of subsets distributed in balance, and a plurality of classifiers are introduced to respectively learn the plurality of balanced subsets. Then final unbiased relationship prediction is collaboratively facilitated by performing knowledge accumulation and transfer in these classifiers. An example implementation process of the technical solution is described below.

Figure 4:
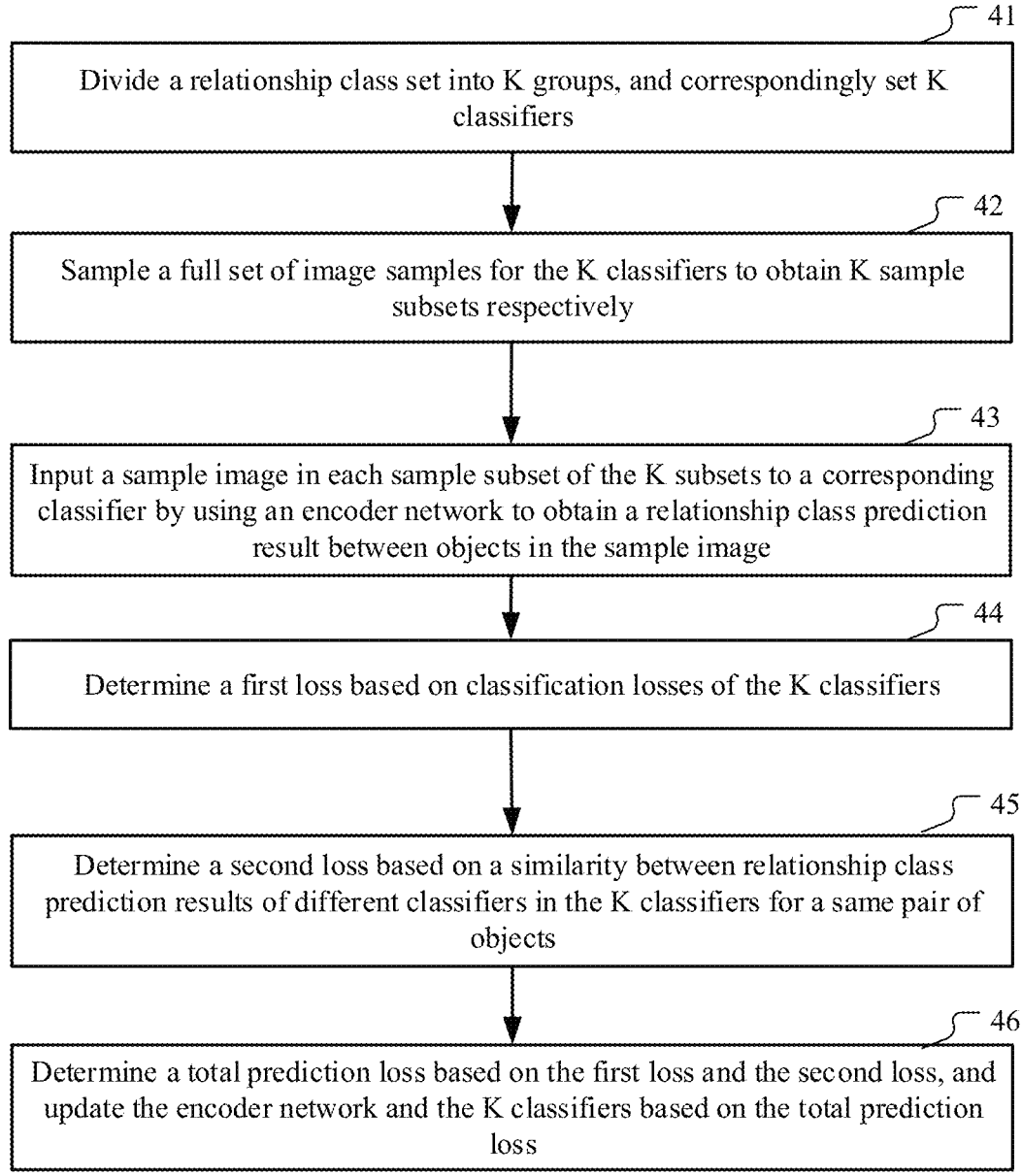
FIG. 4 is a flowchart illustrating a method for training a relationship recognition model according to an implementation.

FIG. 4 is a flowchart illustrating a method for training a relationship recognition model according to an implementation. The method can be performed by any computing unit, platform, server, device, etc., having computing and processing capabilities or by a specialized computer that are dedicated for accelerating the processes of training a relationship recognition model. A structure of a relationship recognition model to be trained is shown in FIG. 2. The relationship recognition model includes an encoder network and a classification network, the encoder network is used to recognize and encode a plurality of objects included in an image, and the classification network is used to recognize a relationship class between the plurality of objects from a predetermined relationship class set. As shown in FIG. 4, the training method can include steps described in detail below.

First, in step 41, the relationship class set is divided into K groups, and K classifiers are correspondingly set to form the classification network. This step is intended to divide an unbalanced data set into a plurality of relatively balanced relationship class groups and set a plurality of corresponding classifiers to facilitate subsequent formation of relatively balanced training data subsets.

As shown in FIG. 3, although a serious long tail effect occurs in overall distribution of the relationship classes in the data set, a range in which data is relatively balanced can be identified locally. Therefore, the total relationship class set can be divided into the K groups by using a certain balance measure as the objective, so that distribution of relationship classes in each group is relatively balanced.

In some implementations, to group the relationship classes, estimated sample sizes corresponding to the relationship classes in the relationship class set are first obtained, for example, as shown in FIG. 3. In an example, the estimated sample size can be obtained by collecting statistics on all relationship classes included in a full set of image samples to be used subsequently. In an example, the estimated sample size can be obtained from other prior distribution data.

The relationship classes can be sorted based on the estimated sample sizes that correspond to the relationship classes and that are obtained above. FIG. 3 is an illustration obtained after relationship classes are sorted in descending order of estimated sample sizes. Then the K groups are formed based on the sorting, so that a sample size difference index between a relationship class with a largest sample size and a relationship class with a smallest sample size in each group is less than predetermined threshold u. The sample size difference index can be a difference value, a difference proportion, etc., between estimated sample sizes.

In some implementation, the relationship classes can be grouped through the following process. For example, the relationship classes can be sequentially traversed based on a sequence of the sorted relationship classes. For a traversed current relationship class i, it is determined whether a sample size difference index between traversed current relationship class i and the first relationship class in formed latest group k is less than predetermined threshold μ. If the sample size difference index is less than predetermined threshold μ, it means that current relationship class i and existing relationship classes in group k are relatively balanced. In this case, current relationship class i can be added to group k. If the sample size difference index between current relationship class i and the first relationship class in group k is not less than predetermined threshold μ, it means that sample sizes of current relationship class i and the existing relationship classes in group k are no longer balanced. In this case, group k+1 is newly generated, current relationship class i is used as the first relationship class in newly generated group k+1, and newly generated group k+1 is used as a formed latest group. Then the next relationship class continues to be traversed. As such, the relationship classes are divided into corresponding groups.

In an example, relationship classes with similar estimated sample sizes can be grouped into one cluster by using estimated sample sizes as features in a way similar to clustering, so that the total relationship class set is divided into the K groups.

Figure 5:
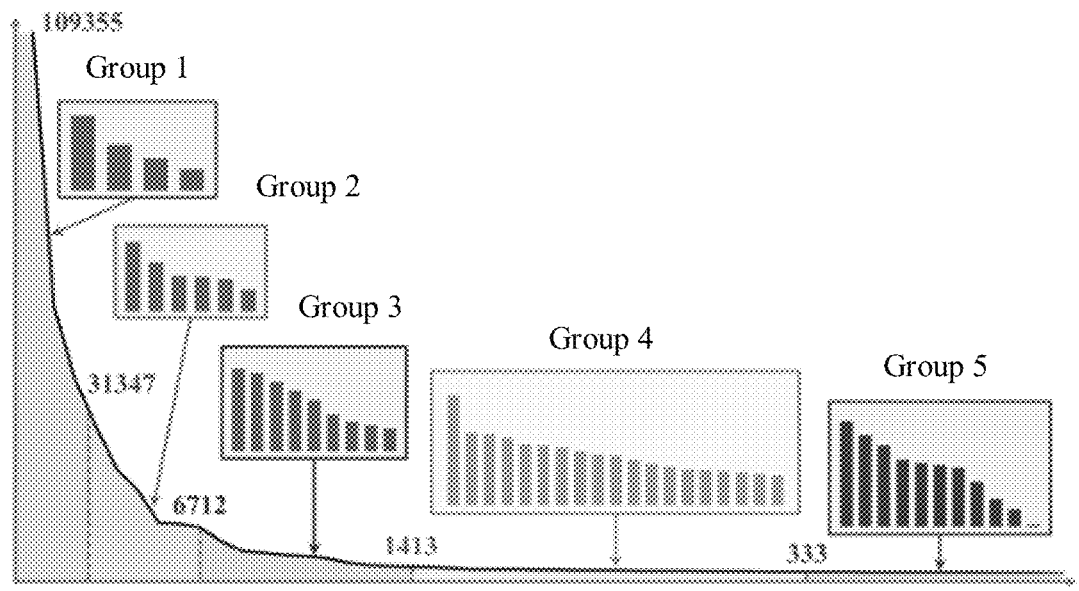
FIG. 5 illustrates K relationship class groups formed in an implementation.

FIG. 5 illustrates K relationship class groups formed in an implementation. It can be seen that relationship class grouping in FIG. 5 is performed based on the distribution of the relationship classes in FIG. 3. In FIG. 5, 50 relationship classes are divided into five groups. Group 1 includes four relationship classes, for example, denoted as c1, c2, c3, and c4 (or "c1-c4"), whose estimated sample sizes are ranked first to fourth, and group 2 includes six relationship classes, for example, denoted as c5, c6, c7, c8, c9, and c10 (or "c5-c10"), whose estimated sample sizes are ranked fifth to tenth. Other groups are shown in the figure. It can be seen that estimated sample sizes in each group are relatively balanced. For example, in FIG. 5, the balance index is set as follows: the sample size difference between the relationship class with the largest sample size and the relationship class with the smallest sample size is less than four times.

The K classifiers are correspondingly set when the relationship class set is divided into the K groups. The K classifiers are set through increment accumulation. For example, classification space of a first classifier, e.g., a recognized class subset, corresponds to relationship classes in a first group. A subsequent classifier k corresponds to a kth classification space, and the kth classification space includes classification space corresponding to a previous classifier, e.g., the (k−1)th classifier, and relationship classes in a kth group. By analogy, classification space corresponding to the kth classifier is the total relationship class set.

Continuing with the example of FIG. 5, in FIG. 5, a total relationship class set including 50 relationship classes is divided into K=5 groups, and therefore, five classifiers are correspondingly set. Classification space of the first classifier is relationship classes in the first group, in other words, classifier 1 is used to classify relationship class subset c1-c4. Classification space of the second classifier is the classification space of the first classifier and relationship classes in the second group, in other words, classifier 2 is used to classify relationship classes c1-c4 and relationship classes c5-c10, e.g., relationship class subset c1-c10. By analogy, the last classifier, classifier 5, is used to classify all of the 50 relationship classes.

When the K groups and the K classifiers are set, in step 42, a full set of image samples is sampled for the K classifiers to obtain K sample subsets respectively.

It should be understood that because sample sizes of relationship classes in each group are relatively balanced, performing sampling for classification space of each classifier can make sample sizes of each sample subset for the corresponding classification space be relatively balanced.

Further, considering that classification space of a subsequent classifier actually includes relationship classes in a plurality of groups and that the relationship classes in the plurality of groups are less balanced, a certain policy can be used in the sampling process to impose a certain constraint on the sampling process, so that sampling distribution of any kth sample subset obtained through sampling for relationship classes in the kth classification space satisfies a determined (predetermined or dynamically determined) condition related to a distribution balance. For example, the determined condition can include the following: A difference index between the relationship class with the largest number of samples and a relationship class with the smallest number of samples is less than a certain threshold, a proportion of the number of samples of head relationship classes to the whole sample subset does not exceed a set threshold, or sampling distribution of relationship classes in classification space satisfies a determined (predetermined or dynamically determined) distribution curve.

In an implementation, a partial downsampling policy can be used to balance sampling distribution of a classifier. For example, target value T is determined for any kth classifier based on estimated sample sizes of relationship classes in the kth classification space. Target value T can be an average or a median of the estimated sample sizes of the relationship classes.

Then a sampling rate of each relationship class is determined based on target value T. A sampling rate of a relationship class whose estimated sample size is greater than target value T is determined to be less than 1, and a sampling rate of a relationship class whose estimated sample size is less than or equal to target value T is determined as 1. Then sampling is performed for each relationship class based on the sampling rate of each relationship class. This means that downsampling is performed for a highly quantitative relationship class whose estimated sample size is greater than the target value, and normal sampling is performed for a relationship class whose estimated sample size is less than or equal to the target value, to balance sampling distribution of one classifier.

In an example, a sampling rate of any classifier k in the partial downsampling policy can be set as follows:

$$\phi_j = \begin{cases} T/\text{count}(c_j) & \text{if } T < \text{count}(c_j) \\ 1 & \text{if } T \geq \text{count}(c_j) \end{cases}, \quad (1)$$

where $\phi_j$ is a sampling rate of relationship class $c_j$ in classifier k, T is the target value of the kth classification space, and $\text{count}(c_j)$ is an estimated sample size of relationship class $c_j$. According to equation (1), a sampling rate of a relationship class whose estimated sample size is greater than target value T (T<count($c_j$)) can be set to a ratio of target value T to an estimated sample size of the relationship class. The ratio is obviously less than 1, and therefore, downsampling is achieved.

When sampling is performed for each relationship class based on the sampling rate determined above, random number comparison can be used to ensure that sampling is performed based on the sampling rate. For example, to perform sampling for relationship class $c_j$, an instance satisfying relationship class $c_j$ can be obtained from the full set of image samples. The instance can be, for example, a pair of objects (O1, O2) satisfying relationship class $c_j$ in a certain image. Then a positive random number less than 1 is generated, in other words, the range of the random number is (0, 1). If the positive random number is less than the sampling rate $\phi_j$ of the relationship class, the instance is sampled as a sample corresponding to relationship class $\phi_j$; otherwise, the instance is discarded.

Continuing with the example of FIG. 5, as described herein, five classifiers are set for the groups in FIG. 5. Classification space of classifier 1 includes c1-c4. Based on the distribution of the estimated sample sizes illustrated in FIG. 5, a target value corresponding to classifier 1 should fall between estimated sample sizes of relationship classes c2 and c3. Therefore, estimated sample sizes of relationship classes c1 and c2 are greater than the target value. Assume that the sampling rate calculation method in equation (1) is used, for example, a sampling rate of class c1 is 0.4, a sampling rate of class c2 is 0.8, and a sampling rate of each of classes c3 and c4 is 1.

When sampling is performed for class c1, a random number between (0, 1) is generated for an instance satisfying relationship class c1, and the random number is compared with the sampling rate 0.4. If the random number is less than 0.4, the instance is used as a sample of class c1; otherwise, the instance is discarded. Because the random number falls between (0, 1) with an equal probability in principle, the probability that the random number is less than 0.4 is 40%, and is equal to the sampling rate. As such, sampling is implemented for the instance satisfying c1 by using the sampling rate as the probability. Sampling processes for classes c2-c4 are similar. As such, sampling is implemented for classifier 1.

Similarly, sampling can be performed for other classifiers. For example, classification space of classifier 2 is c1-c10 (c1, c2, c3, c4, c5, c6, c7, c8, c9, and c10). Assume that a target value of classifier 2 falls between c4 and c5. In this case, downsampling needs to be performed for c1-c4 at a sampling rate less than 1, and normal sampling is performed for c5-c10.

According to the various methods described herein, sampling is respectively performed for the K classifiers to obtain K corresponding sample subsets. Distribution of sample sizes (number of instances) of relationship classes in each sample subset is relatively balanced.

Returning to FIG. 4, next, in step 43, a sample image in each sample subset of the K subsets is input to a corresponding classifier by using the encoder network to obtain a relationship class prediction result between objects in the sample image.

For example, a sample image in sample subset k is input to the encoder network. The encoder network recognizes and encodes objects in the sample image to obtain encoded features of the objects. An encoded feature of an instance, e.g., a pair of objects $(o_i, o_j)$, sampled for classifier k is input to the kth classifier to obtain a relationship class prediction result for the pair of objects. The above operations are performed for each instance of each sample image in each sample subset, so that each classifier predicts a relationship class for a pair of objects input to the classifier.

In some implementations, a total prediction loss is jointly determined from two aspects of parallel classifier optimization (PCO) and collaborative knowledge distillation (CKD) with reference to relationship class prediction results output by the classifiers. This improves collaborative learning and collaborative optimization of a plurality of classifiers, In step 44, a first loss is determined based on classification losses of the K classifiers. A classification loss of a classifier of the K classifiers is determined based on a relationship class prediction result obtained by the classifier and a corresponding class label. The first loss is a loss determined based on the PCO solution.

For example, a classification loss of the kth classifier can be determined based on a relationship class prediction result of the kth classifier in the K classifiers for an instance sample in the kth sample subset and a corresponding class label, and a sum of the classification losses of the K classifiers can be calculated to obtain the first loss.

In an example, the first loss can be determined according to the following equation (2):

$$\mathcal{L}_{PCO} = \sum_{k=1}^{K} \frac{1}{|\mathcal{D}_k|} \sum_{(o_i, o_j) \in \mathcal{D}_k} \mathcal{L}_{CE}(y_{ij}, w_{ij}^k), \quad (2)$$

where $D_k$ is the kth sample subset, $|D_k|$ is the number of instances in the kth sample subset, $L_{CE}$ is a cross entropy loss function, $y_{ij}$ represents a relationship class label corresponding to instance sample $(o_i, o_j)$, and $w_{ij}^k$ is a relationship class prediction result obtained by the kth classifier for instance sample $(o_i, o_j)$. Generally, $w_{ij}^k$ is in the form of a probability distribution vector, and one element thereof represents a probability that instance sample $(o_i, o_j)$ belongs to one relationship class in the kth classification space.

According to equation (2), for single instance $(o_i, o_j)$ processed by classifier k, the cross entropy loss function $L_{CE}$ can be used to calculate a prediction loss of the instance sample, and then a sum of prediction losses of all instances in the kth sample subset is calculated and then divided by the number of instances to obtain the classification loss of the kth classifier. A sum of classification losses of the K classifiers is calculated (in other words, the sum is calculated for k from 1 to K) to obtain the first loss $L_{PCO}$.

In addition, in step 45, a second loss is determined based on a similarity between relationship class prediction results of different classifiers in the K classifiers for a same pair of objects. The second loss is used to establish a knowledge transfer mechanism and knowledge distillation between classifiers, so that a subsequent classifier can learn a prediction capability of a previous classifier. Therefore, the second loss is called a loss measure used for CKD.

To determine the CKD loss, for an instance sample, e.g., a pair of objects $(o_i, o_j)$, a first prediction result $w_{ij}^m$ predicted by first classifier m in first classification space for instance $w_{ij}^m$ is obtained. The first prediction result is a probability distribution vector, and a dimension of the first prediction result is the same as dimension dm of the first classification space. In addition, a second prediction result $w_{ij}^n$ predicted by second classifier n in second classification space for the instance is further obtained. A dimension of the second prediction result is the same as dimension dn of the second classification space. Assuming that second classifier n is a subsequent classifier, the second classification space includes the first classification space, and dimension dn of the second classification space is greater than dm of the first classification space, in other words, dn>dm. Therefore, the dimension of the second prediction result is greater than that of the first prediction result.

Therefore, a part corresponding to the dimension of the first prediction result can be truncated from the second prediction result $w_{ij}^n$ to obtain a second truncation result $\hat{w}_{ij}^n$. A dimension of the part is the same as that of the first prediction result. It can be understood that the part of the second prediction result corresponding to the dimension of the first prediction result corresponds to prediction of the second classifier for a relationship class included in the first classification space, and the part is comparable to the first prediction result in dimension and meaning. Therefore, a similarity between the first prediction result $w_{ij}^m$ and the second prediction result $\hat{w}_{ij}^n$ can be determined, and the above second loss can be determined based on the similarity. In different implementations, the above similarity can be determined by a cosine similarity, a KL divergence, an inner product of vectors, etc.

Continuing with the example of FIG. 5, assume that the first classifier is classifier 1, the first prediction result $w_{ij}^m$ is a four-dimensional probability distribution vector, indicating distribution of probabilities that a certain instance belongs to relationship classes c1-c4; and assume that the second classifier is classifier 2, and the second prediction result $w_{ij}^n$ is a ten-dimensional probability distribution vector, indicating distribution of probabilities that the instance belongs to relationship classes c1-c10. In this case, the first four dimensions of the second prediction result indicate the distribution of the probabilities, predicted by classifier 2, that the instance belongs to c1-c4. Therefore, the first four dimensions of the second prediction result can be truncated as the second truncation result $\hat{w}_{ij}^n$. A similarity between prediction results of classifier 2 and classifier 1 for classes c1-c4 is determined by using the first prediction result and the second truncation result.

In an implementation, the pair of objects $(o_i, o_j)$ forming the above instance sample is a pair of objects in a common sample image in a first sample subset corresponding to first classifier m and a second sample subset corresponding to second classifier n. As such, the first prediction result and the second prediction result can be read and reused from relationship class prediction results output by the classifiers in step 43. In another implementation, the pair of objects $(o_i, o_j)$ is an instance in a sample subset corresponding to a certain classifier, and therefore, a corresponding prediction result can be read from the relationship class prediction results in step 43. To determine the second loss, the pair of objects can be artificially input to another classifier whose classification space includes a class label of the pair of objects to obtain another prediction result, and the prediction result and the another predict result are used as the first prediction result and the second prediction result respectively.

In an example, the second loss $L_{CKD}$ can be determined according to the following equation (3):

$$\mathcal{L}_{CKD} = \frac{1}{|Q|} \sum_{(m,n) \in Q} \frac{1}{|\mathcal{D}_n|} \sum_{(o_i,o_j) \in \mathcal{D}_n} \mathcal{L}_{KL}(w_{ij}^m, \hat{w}_{ij}^n), \qquad (3)$$

where Q is a set of distillation learning pairs including classifier m and classifier n, $w_{ij}^m$ is the first prediction result obtained by classifier m for the pair of objects $(o_i, o_j)$, $\hat{w}_{ij}^n$ is the second truncation result obtained by truncating the second prediction result of classifier n, and $L_{KL}$ is a KL divergence loss function. An example form of $L_{KL}$ is shown in the following equation (4):

$$\mathcal{L}_{KL}(w_m, \hat{w}_n) = -\sum_{l=1}^{L} w_m^l \log \hat{w}_n^l. \qquad (4)$$

In different implementations, set Q can be obtained in different ways. For example, K classifiers are combined in pairs, or each classifier is combined with a next classifier, or the Kth classifier is combined with the (K−1)th classifier. In other implementations, another similarity determining function can be used to replace the KL divergence loss function in equation (3). This is not limited herein.

When the first loss and the second loss are determined, in step 46, a total prediction loss is determined based on the first loss and the second loss, and the encoder network and the K classifiers are updated based on the total prediction loss.

In an implementation, a weighted sum of the first loss $L_{PCO}$ and the second loss $L_{CKD}$ can be calculated based on a determined (predetermined or dynamically determined) weight factor to obtain the total prediction loss. For example, as shown in the following equation (5), the total prediction loss $L_{GCL}$ of a group collaborative learning (GCL) is obtained:

$$\mathcal{L}_{GCL} = \mathcal{L}_{PCO} + \alpha \mathcal{L}_{CKD} \qquad (5),$$

where α is the determined weight factor.

It can be seen that the total prediction loss is a combination of the PCO loss and the CKD loss. The first loss $L_{PCO}$ determined based on the PCO solution is intended to facilitate the convergence of the last classifier by performing loss calculation and gradient descent on all classifiers. The PCO method can be considered as a weak constraint policy for a subsequent classifier. For example, classification losses of all the classifiers are aggregated to implicitly improve the prediction performance of the last classifier.

Knowledge transfer and knowledge distillation can be established based on the second loss $L_{CKD}$ determined based on the CKD method, so that a subsequent classifier learns a prediction result of a previous classifier. Because the previous classifier has small classification space, a small range of prediction classes, and a large sample size, the previous classifier can learn strong prediction performance for a small range of relationship classes. The subsequent classifier can learn the prediction result of the previous classifier to improve a prediction capability for a relationship class that ranks higher. The method can be considered as a strong constraint policy that improves unbiased prediction performance of the subsequent classifier by forcing the subsequent classifier to learn a prediction behavior of the previous classifier, so that the last classifier has a strong prediction capability for both a head relationship class that ranks higher and a tail relationship class in a long tail part.

According to the above implementations, a relationship class set is divided, and a plurality of classifiers are set, so that the plurality of classifiers perform collaborative learning, thereby overcoming or alleviating adverse impact of a long tail effect of a sample distribution deviation on training of a relationship class recognition model. Knowledge accumulation and transfer are performed between the classifiers to facilitate final unbiased relationship prediction and improve the prediction performance.

It should be understood that, in the K classifiers trained in the method of the implementations described herein, the Kth classifier is a classifier with full classification space, and can recognize all relationship classes in the total relationship class set, while the other K−1 classifiers are used to assist in training of the Kth classifier. Therefore, after the training process is completed, it is feasible to only use the Kth classifier to analyze an image by using the relationship recognition model.

For example, in the image analysis process, a target image to be recognized can be input to the Kth classifier by using the encoder network, and the Kth classifier classifies and predicts relationship classes between a plurality of objects included in the target image. Further, in an implementation, a scene graph can be generated based on a recognition result of the relationship recognition model. For example, a scene graph corresponding to the target image can be generated by using the plurality of objects in the image as a plurality of nodes and the recognized relationship class as an edge, for example, as shown on the right of FIG. 1.

In addition, the inventors have found that in the relationship class recognition process, information of a plurality of modes is involved. For example, one mode is visual feature information, including an image feature and a frame position feature, and another mode is text feature information, including a text description of the recognized object class, for example, dog or ear shown in FIG. 1. The information of the plurality of modes needs to be fused to jointly determine the relationship class between the objects. To improve the prediction performance of the relationship recognition model, it is further considered to improve the relationship recognition model by facilitating the fusion of modes.

Figure 6:
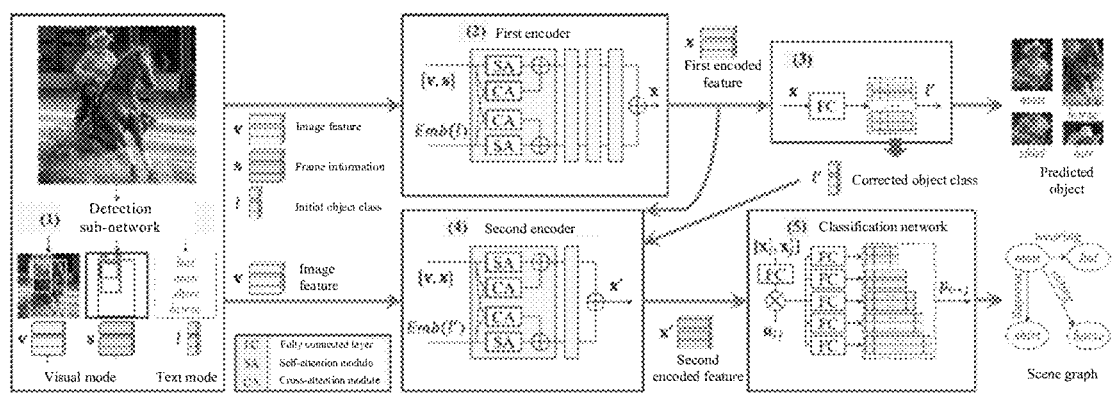
FIG. 6 is a schematic diagram illustrating a structure and a processing process of a relationship recognition model according to an implementation.

FIG. 6 is a schematic diagram illustrating a structure and a processing process of a relationship recognition model according to an implementation. As described herein with reference to FIG. 2, a relationship recognition model usually includes an encoder network and a classification network, the encoder network is used to recognize and encode a plurality of objects included in an image, and the classification network recognizes a relationship class between the objects based on at least encoded features of the objects. A structure of the encoder network is further shown in detail in FIG. 6. As shown in FIG. 6, the encoder network includes a detection sub-network, a first encoder, a first decoder, and a second encoder. An encoding process of the encoder network is as follows.

The detection sub-network can be a pre-trained target detection model, for example, Mask R-CNN or Faster-CNN. When an image is input to the detection sub-network, the detection sub-network recognizes objects in the image, and outputs image features v, frame information s, and initial object classes l of the objects included in the image.

Then, in the first encoder, an attention-based encoding operation is performed based on image features v, frame information s, and initial object classes l of the objects to obtain first encoded features x of the objects. First encoded feature x is a more refined and integrated object feature obtained based on image feature v, frame information s, and initial object class l.

Then the first decoder obtains corrected object classes l' of the objects based on first encoded features x of the objects. Because first encoded feature x is a more integrated feature obtained by fusing a plurality of features, object class l' output by the first decoder based on first encoded feature x may be different from original object class l output by the detection sub-network, and can be used as a correction to the original object class.

Then, in the second encoder, an attention-based encoding operation is performed based on image features v, first encoded features x output by the first encoder, and corrected object classes l' output by the first decoder, to obtain second encoded features x' of the objects. Therefore, second encoded feature x is a further refined and integrated object feature representation.

Therefore, second encoded features x' of the objects can be input to the classification network, for example, a corresponding classifier in the above K classifiers, to recognize a relationship class between the objects.

In an implementation, some hybrid attention layers are disposed in one or more of the first encoder or the second encoder, and self-attention processing and cross-attention processing are introduced in the hybrid attention layer to achieve a better fusion effect. This helps to fuse features of different modes.

Figure 7:
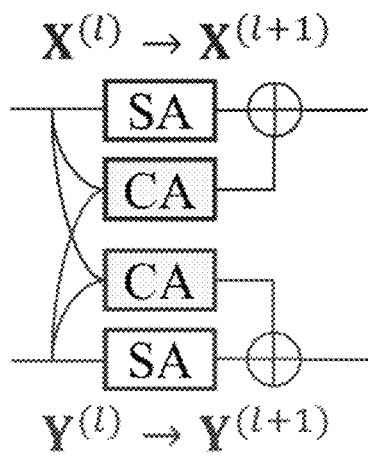
FIG. 7 is a schematic diagram illustrating a processing process of a hybrid attention layer.

FIG. 7 is a schematic diagram illustrating a processing process of a hybrid attention layer. As shown in the figure, any Ith hybrid attention layer includes a self-attention module SA and a cross-attention module CA disposed for each of two types of features (or features of two modes). For example, the Ith hybrid attention layer includes a first attention module SA and a first cross-attention module CA disposed for a first type of feature and a second attention module SA and a second cross-attention module CA disposed for a second type of feature. The Ith hybrid attention layer performs attention-based fusion encoding processing on the first type of feature $X^{(I)}$ and the second type of feature $Y^{(I)}$ input to the Ith hybrid attention layer. Details of the processing process are as follows.

In the first attention module, a self-attention-based transformation is performed on the first type of feature $X^{(I)}$ input to the hybrid attention layer, to obtain a first self-transformed feature $SA(X^{(I)})$. In the first cross-attention module, a composite transformation is performed on the first type of feature $X^{(I)}$ and the second type of feature $Y^{(I)}$ input to the hybrid attention layer based on attention of the second type of feature $Y^{(I)}$ relative to the first type of feature $X^{(I)}$, to obtain a first cross-transformed feature $CA(X^{(I)}, Y^{(I)})$. The first self-transformed feature and the first cross-transformed feature are combined as a first type of feature $X^{(I+1)}$ output by the hybrid attention layer. In an example, the first type of output feature is represented as follows:

$$X^{(I+1)}=SA(X^{(I)})+CA(X^{(I)},Y^{(I)}) \quad (6),$$

It can be understood that the first type of feature $X^{(I+1)}$ is used as a first type of feature input to the next hybrid attention layer (the (I+1)th layer).

In the second attention module, a self-attention-based transformation is performed on the second type of feature $Y^{(I)}$ input to the hybrid attention layer, to obtain a second self-transformed feature $SA(Y^{(I)})$. In the second cross-attention module, a composite transformation is performed on the second type of feature $Y^{(I)}$ and the first type of feature $X^{(I)}$ input to the hybrid attention layer based on attention of the first type of feature $X^{(I)}$ relative to the second type of feature $Y^{(I)}$, to obtain a second cross-transformed feature $CA(Y^{(I)}, X^{(I)})$. The second self-transformed feature and the second cross-transformed feature are combined as a second type of feature $Y^{(I+1)}$ output by the hybrid attention layer. In an example, the second type of output feature is represented as follows:

$$Y^{(I+1)}=SA(Y^{(I)})+CA(Y^{(I)},X^{(I)}) \quad (7),$$

It can be understood that the second type of feature $Y^{(I+1)}$ is used as a second type of feature input to the next hybrid attention layer (the (I+1)th layer).

The above self-attention-based transformation SA is performed by using a known self-attention mechanism. For example, an attention transformation function determined based on parameter matrices Q, K, and V is applied to a feature matrix input to the hybrid attention layer, to obtain a transformed feature matrix. The cross-attention-based composite transformation CA is performed by using a known cross-attention mechanism. For example, an attention transformation function is applied to a first feature matrix and a second feature matrix input to the hybrid attention layer in order. Parameter matrix Q is applied to the first feature matrix, and parameter matrices K and V are applied to the second feature matrix. The first type of feature and the second type of feature can be more fully fused by using the above hybrid attention layer.

It should be noted that when the hybrid attention layer is used in the first encoder, the first type of feature X input to the hybrid attention layer corresponds to a visual feature, and includes image feature v and frame feature s of each object, for example, a combination of image feature v and frame feature s. The second type of feature Y corresponds to a text feature, and is an embedded vector representation of initial object class l.

When the hybrid attention layer is used in the second encoder, the first type of feature X input to the hybrid attention layer includes image feature v and first encoded feature x of each object, and still corresponds to a visual feature. For example, X can be a combination of image feature v and first encoded feature x. The second type of feature Y corresponds to a text feature, and is an embedded vector representation of corrected object class l'.

In the illustration of FIG. 6, the hybrid attention layer is used in each of the first encoder and the second encoder to fully fuse a visual feature and a text feature. In practice, a variant implementation can be used to introduce the hybrid attention layer in one of the two encoders.

In an implementation, the structure of FIG. 6 can be simplified to obtain a simplified relationship recognition model. The simplification can include removing the first decoder and the second encoder in FIG. 6. As such, an image processing process includes: inputting a target image to a detection sub-network to obtain image features, frame information, and initial object classes of some objects included in the image; then performing an attention-based encoding operation based on the image features, the frame information, and the initial object classes by using a first encoder, to obtain encoded features of the objects; and directly outputting the encoded features of the objects obtained by the first encoder to a classification network, so that the classification network recognizes a relationship class between the objects. In such a case, a hybrid attention layer can be used in the first encoder. The structure and the processing mechanism of the hybrid attention layer are described herein and are omitted for simplicity.

The first type of feature and the second type of feature of different modes can be fully fused by using the encoder in which the hybrid attention layer is introduced, to optimize the object encoding representation of the encoder network, thereby improving the classification performance of the subsequent classification network for relationship classes between the objects.

Figure 8:
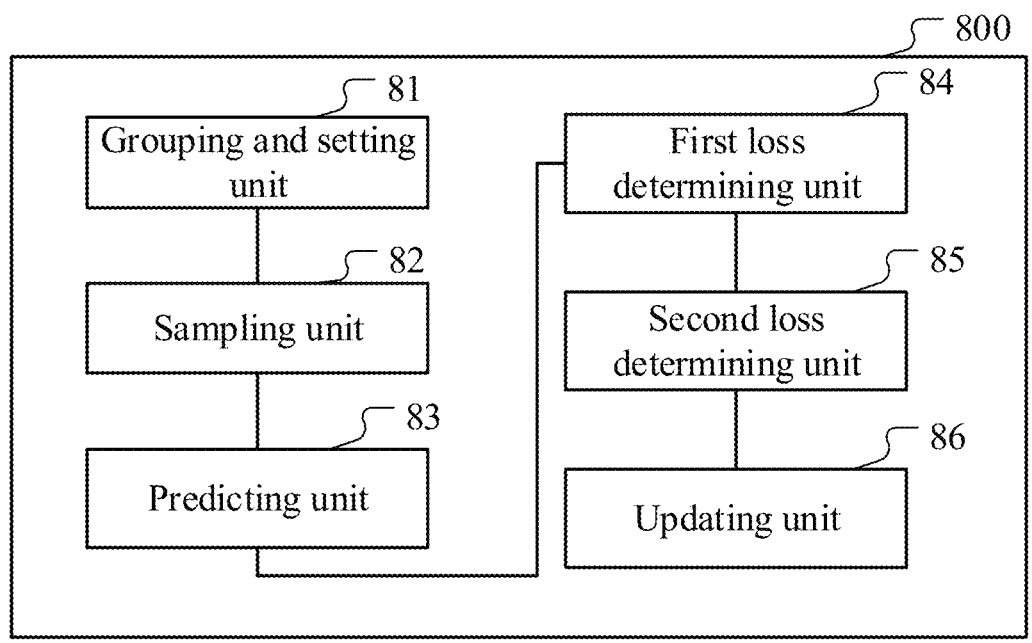
FIG. 8 illustrates an apparatus for training a relationship recognition model according to an implementation.

According to an implementation of another aspect, corresponding to the training method shown in FIG. 4, the present specification further provides an apparatus for training a relationship recognition model. The apparatus can be deployed in any computing unit, platform, server, or device having computing and processing capabilities. A relationship recognition model to be trained includes an encoder network and a classification network, the encoder network is used to recognize and encode a plurality of objects included in an image, and the classification network is used to recognize a relationship class between the plurality of objects from a determined (predetermined or dynamically determined) relationship class set. FIG. 8 illustrates an apparatus for training a relationship recognition model according to an implementation. As shown in FIG. 8, the apparatus 800 includes: a grouping and setting unit 81, configured to divide the relationship class set into K groups, and correspondingly set K classifiers to form a classification network, where classification space of a first classifier in the K classifiers corresponds to relationship classes in a first group, and a kth classification space corresponding to a subsequent kth classifier includes classification space corresponding to a previous classifier of the kth classifier and relationship classes in a kth group; a sampling unit 82, configured to sample a full set of image samples for the K classifiers to obtain K sample subsets respectively; a predicting unit 83, configured to input a sample image in each sample subset of the K subsets to a corresponding classifier by using an encoder network to obtain a relationship class prediction result between objects in the sample image; a first loss determining unit 84, configured to determine a first loss based on classification losses of the K classifiers, where a classification loss of a classifier of the K classifiers is determined based on a relationship class prediction result obtained by the classifier and a corresponding class label; a second loss determining unit 85, configured to determine a second loss based on a similarity between relationship class prediction results of different classifiers in the K classifiers for a same pair of objects; and an updating unit 86, configured to determine a total prediction loss based on the first loss and the second loss, and update the encoder network and the K classifiers based on the total prediction loss.

The units of the above apparatus can be configured to perform the method steps of FIG. 4. For an execution process, references can be made to the above descriptions provided with reference to FIG. 4. Details are omitted for simplicity.

According to an implementation of another aspect, a computer-readable storage medium is further provided. The computer-readable storage medium stores a computer program, and when the computer program is executed on a computer, the computer is enabled to perform the training method described with reference to FIG. 4.

According to an implementation of still another aspect, a computing device is further provided. The computing device includes a memory and a processor, the memory stores executable code, and the processor implements the training method described with reference to FIG. 4 when executing the executable code.

A person skilled in the art should be aware that, in the above one or more examples, functions described in the present specification can be implemented by hardware, software, firmware, or any combination thereof. When the functions are implemented by software, the functions can be stored in a computer-readable medium or transmitted as one or more instructions or code in the computer-readable medium.

The objectives, technical solutions, and beneficial effects of the present specification are further described in detail in the above example implementations. It should be understood that the descriptions are merely example implementations of the present specification, but are not intended to limit the protection scope of the present specification. Any modification, equivalent replacement, or improvement made based on the technical solutions of the present specification shall fall within the protection scope of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for training a relationship recognition model, the relationship recognition model including an encoder network and a classification network, the encoder network being used to recognize and encode a plurality of objects included in an image, the classification network being used to recognize a relationship class between the plurality of objects from a determined relationship class set, and the method comprising:

dividing the relationship class set into K groups, and correspondingly setting K classifiers to form the classification network, classification space of a first classifier in the K classifiers corresponding to relationship classes in a first group, and a kth classification space corresponding to a kth classifier including classification space corresponding to a previous classifier of the kth classifier and relationship classes in a kth group;

sampling a full set of image samples for the K classifiers to obtain K sample subsets respectively;

inputting a sample image in each sample subset of the K subsets to a corresponding classifier by using the encoder network to obtain a relationship class prediction result between objects in the sample image;

determining a first loss based on classification losses of the K classifiers, a classification loss of a classifier of the K classifiers being determined based on a relationship class prediction result obtained by the classifier and a corresponding class label;

determining a second loss based on a similarity between relationship class prediction results of different classifiers in the K classifiers for a same pair of objects; and determining a total prediction loss based on the first loss and the second loss, and updating the encoder network and the K classifiers based on the total prediction loss.

2. The method according to claim 1, wherein the dividing the relationship class set into the K groups includes:

sorting relationship classes in the relationship class set based on estimated sample sizes corresponding to the relationship classes; and forming the K groups based on the sorting, so that a sample size difference index between a relationship class with a largest sample size and a relationship class with a smallest sample size in each group is less than a threshold.

3. The method according to claim 2, wherein the estimated sample size is obtained by collecting statistics on all relationship classes included in the full set of image samples.

4. The method according to claim 2, wherein the forming the K groups based on the sorting includes:

traversing the relationship classes based on the sorting, wherein for a traversed current relationship class, it is determined whether a first sample size difference index between the traversed current relationship class and the first relationship class in a formed latest group is less than the threshold; and in response to that the first sample size difference index is less than the threshold, adding the current relationship class to the latest group; or in response to that the first sample size difference index is not less than the threshold, generating a new group, using the current relationship class as the first relationship class in the new group, and using the new group as a formed latest group.

5. The method according to claim 1, wherein the K sample subsets include a kth sample subset, and sampling distribution of the kth sample subset for relationship classes in the kth classification space satisfies a condition related to a distribution balance.

6. The method according to claim 1, wherein the sampling the full set of image samples for the K classifiers respectively includes:

determining a target value for a kth classifier of the K classifiers based on estimated sample sizes of relationship classes in the kth classification space, wherein the target value is a mean or a median of estimated sample sizes of the relationship classes;

determining a sampling rate of each relationship class based on the target value, the determining including determining a first sampling rate corresponding to a first relationship class, the first sampling rate being less than 1, and an estimated sample size of the first relationship class being greater than the target value; and performing sampling for each relationship class based on the sampling rate of each relationship class.

7. The method according to claim 6, wherein the determining the sampling rate of each relationship class further includes: determining that a second sampling rate corresponding to a second relationship class is 1, an estimated sample size of the second relationship class being less than or equal to the target value.

8. The method according to claim 6, wherein the determining the first sampling rate corresponding to the first relationship class includes:

determining the first sampling rate as a ratio of the target value to the estimated sample size of the first relationship class.

9. The method according to claim 6, wherein the performing sampling for each relationship class based on the sampling rate of each relationship class includes:

obtaining a first sample satisfying the first relationship class from the full set of image samples;

generating a positive random number less than 1;

in response to that the positive random number is less than the first sampling rate, sampling the first sample as a sample corresponding to the first relationship class; and in response to that the positive random number is not less than the first sampling rate, discarding the first sample.

10. The method according to claim 1, wherein the determining the first loss based on the classification losses of the K classifiers includes:

determining a classification loss of the kth classifier based on a relationship class prediction result of the kth classifier for a sample in the kth sample subset and a corresponding class label; and determining a sum of the classification losses of the K classifiers as the first loss.

11. The method according to claim 1, wherein the determining the second loss based on the similarity between the relationship class prediction results of different classifiers in the K classifiers for the same pair of objects includes:

obtaining a first prediction result predicted by a first classifier in the K classifiers for a pair of objects in first classification space and a second prediction result predicted by a second classifier for the pair of objects in second classification space respectively, wherein a dimension of the second classification space is greater than that of the first classification space;

truncating a part corresponding to a dimension of the first prediction result from the second prediction result to obtain a second truncation result;

determining a first similarity between the first prediction result and the second truncation result; and determining the second loss based on at least the first similarity.

12. The method according to claim 11, wherein the pair of objects is a pair of objects in a common sample image in a first sample subset corresponding to the first classifier and a second sample subset corresponding to the second classifier.

13. The method according to claim 11, wherein the determining the first similarity between the first prediction result and the second truncation result includes:

determining a KL divergence between the first prediction result and the second truncation result as the first similarity.

14. The method according to claim 1, wherein the determining the total prediction loss based on the first loss and the second loss includes:

calculating a weighted sum of the first loss and the second loss based on a weight factor to obtain the total prediction loss.

15. The method according to claim 1, wherein the encoder network includes a detection sub-network and a first encoder, and the inputting the sample image in each sample subset of the K subsets to a corresponding classifier by using the encoder network includes:

inputting a first sample image to the detection sub-network to obtain image features, frame information, and initial object classes of first objects included in the first sample image; and performing an attention-based encoding operation based on the image features, the frame information, and the initial object classes of the first objects by using the first encoder, to obtain first encoded features of the first objects.

16. The method according to claim 15, wherein the first encoder includes one or more hybrid attention layers, each hybrid attention layer of the one or more hybrid attention layers includes a self-attention module and a cross-attention module disposed for each of two types of features, and the attention-based encoding operation includes following operations in a single hybrid attention layer:

performing a self-attention-based transformation on either one of the two types of features that are inputted by using a self-attention module corresponding to the either one type of feature, to obtain a first transformed feature;

performing a composite transformation on the two types of features based on attention of another one of the two types of features relative to the one type of feature by using a cross-attention module corresponding to the one type of feature, to obtain a second transformed feature; and combining the first transformed feature and the second transformed feature as an output of the one type of feature, wherein:

two types of features input to the first encoder include a first type of feature obtained based on the image features and the frame information of the first objects and a second type of feature obtained based on the initial object classes of the first objects.

17. The method according to claim 15, wherein the encoder network further includes a first decoder and a second encoder, and the inputting the sample image in each sample subset of the K subsets to a corresponding classifier by using the encoder network further includes:

obtaining corrected object classes of the first objects based on the first encoded features of the first objects by using the first decoder; and performing an attention-based encoding operation based on the image features, the first encoded features, and the corrected object classes of the first objects by using the second encoder, to obtain second encoded features of the first objects for input to the corresponding classifier.

18. The method according to claim 17, wherein one or more of the first encoder or the second encoder include some hybrid attention layers, each hybrid attention layer includes a self-attention module and a cross-attention module disposed for each of two types of features, and the attention-based encoding operation includes the following operations in a single hybrid attention layer:

performing a self-attention-based transformation on either one of the two types of features that are inputted by using a self-attention module corresponding to the either one type of feature, to obtain a first transformed feature;

performing a composite transform on the two types of features based on attention of another one of the two types of features relative to the one type of feature by using a cross-attention module corresponding to the one type of feature, to obtain a second transformed feature; and combining the first transformed feature and the second transformed feature as an output of the one type of feature, wherein:

two types of features input to the first encoder include a first type of feature obtained based on the image features and the frame information of the first objects and a second type of feature obtained based on the initial object classes of the first objects; and two types of features input to the second encoder include a first type of feature obtained based on the image features and the first encoded features of the first objects and a second type of feature obtained based on the corrected object classes of the first objects.

19. A computing system comprising one or more processors and one or more memory devices, the one or more memory devices individually or collectively having computer executable instructions stored thereon, which when executed by the one or more processors individually or collectively, enable the one or more processors to individually or collectively perform actions to train a relationship recognition model, the relationship recognition model including an encoder network and a classification network, the encoder network being used to recognize and encode a plurality of objects included in an image, the classification network being used to recognize a relationship class between the plurality of objects from a relationship class set, the actions including:

dividing the relationship class set into K groups, and correspondingly setting K classifiers to form the classification network, classification space of a first classifier in the K classifiers corresponding to relationship classes in a first group, and a kth classification space corresponding to a kth classifier including classification space corresponding to a previous classifier of the kth classifier and relationship classes in a kth group;

sampling a full set of image samples for the K classifiers to obtain K sample subsets respectively;

inputting a sample image in each sample subset of the K subsets to a corresponding classifier by using the encoder network to obtain a relationship class prediction result between objects in the sample image;

determining a first loss based on classification losses of the K classifiers, a classification loss of a classifier of the K classifiers being determined based on a relationship class prediction result obtained by the classifier and a corresponding class label;

determining a second loss based on a similarity between relationship class prediction results of different classifiers in the K classifiers for a same pair of objects; and determining a total prediction loss based on the first loss and the second loss, and updating the encoder network and the K classifiers based on the total prediction loss.

20. A non-transitory storage medium having computer executable instructions stored thereon, the computer executable instructions, when executed by one or more processors, enable the one or more processors to individually or collectively implement acts to train a relationship recognition model, the relationship recognition model including an encoder network and a classification network, the encoder network being used to recognize and encode a plurality of objects included in an image, the classification network being used to recognize a relationship class between the plurality of objects from a relationship class set, the acts including:

dividing the relationship class set into K groups, and correspondingly setting K classifiers to form the classification network, classification space of a first classifier in the K classifiers corresponding to relationship classes in a first group, and a kth classification space corresponding to a kth classifier including classification space corresponding to a previous classifier of the kth classifier and relationship classes in a kth group;

sampling a full set of image samples for the K classifiers to obtain K sample subsets respectively;

inputting a sample image in each sample subset of the K subsets to a corresponding classifier by using the encoder network to obtain a relationship class prediction result between objects in the sample image;

determining a first loss based on classification losses of the K classifiers, a classification loss of a classifier of the K classifiers being determined based on a relationship class prediction result obtained by the classifier and a corresponding class label;

determining a second loss based on a similarity between relationship class prediction results of different classifiers in the K classifiers for a same pair of objects; and determining a total prediction loss based on the first loss and the second loss, and updating the encoder network and the K classifiers based on the total prediction loss.

* * * * *